United States Patent [19]

Okamoto et al.

[11] Patent Number: 5,066,743
[45] Date of Patent: Nov. 19, 1991

[54] TWO-PART COMPOSITION COMPRISING A CYANOACRYLATE ADHESIVE AND A PRIMER COMPRISING A TERTIARY AMMONIUM CARBOXYLATE COMPOUND

[75] Inventors: Yoshihisa Okamoto, Avon; Philip T. Klemarczyk, Collinsville, both of Conn.

[73] Assignee: Loctite Corporation, Hartford, Conn.

[21] Appl. No.: 568,386

[22] Filed: Aug. 16, 1990

Related U.S. Application Data

[62] Division of Ser. No. 329,221, Mar. 27, 1989, Pat. No. 4,979,993.

[51] Int. Cl.$^5$ .................... C08F 2/00; C08F 20/34
[52] U.S. Cl. ......................................... 526/215; 526/298
[58] Field of Search ............... 526/215, 298; 106/243, 106/287.3, 287.23, 287.35

[56] References Cited

U.S. PATENT DOCUMENTS

| | | | |
|---|---|---|---|
| 2,897,170 | 7/1959 | Gruber | 524/245 |
| 3,260,637 | 7/1966 | Von Bramer | 156/314 |
| 3,326,742 | 6/1967 | Sheperd | 428/409 |
| 3,332,816 | 7/1967 | Kalinowski | 524/398 |
| 3,822,312 | 7/1974 | Sato et al. | 252/541 |
| 4,200,549 | 4/1980 | Okamura et al. | 524/724 |
| 4,377,490 | 3/1983 | Shiraishi et al. | 252/188.3 R |
| 4,425,471 | 10/1984 | Millet | 526/298 |
| 4,450,265 | 5/1984 | Harris | 526/298 |
| 4,460,759 | 7/1984 | Robins | 526/298 |
| 4,496,685 | 1/1985 | Nagasawa et al. | 526/298 |
| 4,532,293 | 7/1985 | Ikeda et al. | 524/754 |
| 4,554,098 | 11/1985 | Klisch et al. | 252/153 |
| 4,933,234 | 6/1990 | Kobe et al. | 428/336 |

FOREIGN PATENT DOCUMENTS

| | | |
|---|---|---|
| 129069 | 12/1984 | European Pat. Off. . |
| 2950523 | 6/1980 | Fed. Rep. of Germany . |
| 3601518 | 7/1986 | Fed. Rep. of Germany . |
| 38-54008 | 2/1968 | Japan . |
| 50-28536 | 3/1975 | Japan . |

OTHER PUBLICATIONS

March, Jerry, *Avanced Organic Chem.: Reactions, Mechanisms, and Structure*, McGraw-Hill Book Co., 1968, p. 220.
*Lange's Handbook of Chemistry*, 13th Ed., McGraw-Hill Book Co., 1985, pp. 5-18, 5-26 and 5-52.
Morrison et al., *Organic Chemistry*, 2nd. Ed., Allyn and Bacon, Boston, 1966, p. 774.
Organic Chemistry, Morrison & Boyd, Allyn and Bacon, Inc., 1983, pp. 776, 778, and 779.

Primary Examiner—Joseph L. Schofer
Assistant Examiner—R. H. Delmendo
Attorney, Agent, or Firm—Steven J. Hultquist

[57] ABSTRACT

The invention relates to a tertiary ammonium alkyl carboxylate primer for bonding surface with cyanoacrylate adhesives, and to a method of bonding low surface energy surfaces using such tertiary ammonium alkyl carboxylates. A preferred primer is tridodecylammonium stearate and preferred solvents for the tertiary ammonium alkyl carboxylate are non-aqueous, low surface tension organic solvents.

25 Claims, 14 Drawing Sheets

TWO-PART COMPOSITION COMPRISING A CYANOACRYLATE ADHESIVE AND A PRIMER COMPRISING A TERTIARY AMMONIUM CARBOXYLATE COMPOUND

CROSS-REFERENCE TO RELATED APPLICATION

This is a division of U.S. application Ser. No. 07/329,221 filed Mar. 27, 1989, and issued Dec. 25, 1990 as U.S. Pat. No. 4,979,993.

BACKGROUND OF THE INVENTION

1. Field of the Invention

This invention relates to a substrate primer for bonding of polymeric surfaces with cyanoacrylate adhesives, and in particular, relates to trialkylammonium alkyl carboxylate primers.

2. Description of the Related Art

Cyanoacrylate adhesive compositions are widely used to bond substrate materials such as metals, wood, glass, ceramic and leather, due to their rapid fixturing properties and their high bonding strength, which for metal-to-metal bonding may be on the order of 1,000 to 3,000 psi as measured by the lap shear strength determination method of ASTM D-1002-64. It is extremely difficult, however, to bond substrates such as low surface energy, non-polar plastics, e.g., polyethylene and polypropylene, with these adhesives.

Although surface treatment methods, such as flame treatment, corona discharge treatment, and chlorochromate oxidizing treatment, have been used to improve cyanoacrylate adhesion to non-polar substrates, these treatment methods generally are complicated and expensive and do not result in uniform treatment of the surface.

A number of primer compositions have been developed for application to hard-to-bond surfaces such as non-polar substrates prior to application of the cyanoacrylate adhesive composition, so that the bonding efficacy of the cyanoacrylate adhesive is enhanced U.S. Pat. No. 4,460,759 to J. Robins, issued July 17, 1984, discloses an adhesive composition comprising an adhesive base which includes an alpha-cyanoacrylate and a stabilizer, in combination with an accelerator compound of the formula MA, wherein M is a cation whose $pK_a$ value in aqueous medium is at least about 10, and A is an anion whose $pK_a$ value in deprotonation equilibrium reaction is less than or equal to about 0. The adhesive composition described in this patent is said to have a set time less than one third of that of the adhesive base alone and an overlap shear value of at least 400 lbs per square inch. Among the cation M species disclosed in the Robins patent are onium cations such as quaternary ammonium cations (see column 4, lines 42-49 of the patent). Illustrative anion A species are exemplified in the disclosure at column 5, lines 8-15 of the patent. The disclosures of this patent and all other references cited herein are hereby incorporated herein by reference.

Organometallic primers such as aluminum alcoholates and aluminum chelates have also been used with cyanoacrylates. European Patent Application 129,068 published Dec. 27, 1984, discloses a primer said to be useful for bonding non-polar or highly crystalline substrates together, or for bonding another material, such as a solid material, coating material, paint or printing ink to the substrate, by an alpha-cyanoacrylate. As examples of such difficult-to-bond substrate materials, this publication mentions polyethylene, polypropylene, polybutene, polyfluoroethylene, and their copolymers, as well as other polymeric substrates such as polyethylene terephthalate, polyacetal, nylon and soft (highly plasticized) PVC film. The disclosed primer comprises one or more organometallic compounds, such as metal alcoholates, 1,3-dicarbonyl complexes, carboxylates, hydrocarbon group-containing metal compounds, and heteroatom-containing organometallic compounds.

Japanese Kokai 82/25,378 published Feb. 10, 1982, discloses solutions of rubber and isocyanates in organic solvents as primers for alpha-cyanoacrylate adhesives.

Kil Pikari, J., et al.. *Adv. Biomater.* 1982, Vol. 4, pp. 101-105, "Adhesion Between Alkyl 2-Cyanoacrylates and Bone Pretreated with 1% Citric Acid," discloses the pretreatment of bone surfaces with 1% citric acid, tartaric acid, or succinic acid, to attempt to improve the adhesion of poly(alkyl 2-cyanoacrylate) thereto. These pretreatments are said not to improve the adhesion strength of the cyanoacrylate bone bond.

West German Offenlegungsschrift 2,950,523 published June 19, 1980, discloses a method of binding urethane formulations to rubber, by coating the rubber surface with a liquid cyanoacrylate adhesive, covering the wet adhesive layer with a polyurethane formulation, and hardening the polyurethane.

Japanese Kokai 74/12,094 published Mar. 22, 1974, describes the treatment of aluminum, polyester, and other substrates, with diethylamine, o-phenylenediamine, or a similar compound, to improve adhesion of such surface to poly(ethyl alpha-cyanoacrylate).

Japanese Kokai 78/35,744 published Apr. 3, 1978, describes the use of poly(methyl methacrylate) solution in dimethylketone as an adhesive composition for porous substrates, e.g., wood, for cyanoacrylate adhesive bonding thereof Primers for low surface energy substrates have also been prepared by dissolving chlorinated polyethylene or a chlorinated polypropylene in a solvent such as toluene. Examples of such primers are disclosed in West German Offenlegungsschrift 3,601,518, published July 24, 1986, and in PCT International Application Number WO 88/5346 Al, published July 28, 1988.

In addition to the above-described primer compositions for enhancing cyanoacrylate adhesive bonding of various substrates, here have been efforts in the art to incorporate additives into the cyanoacrylate bonding medium. These additives function as adhesion promoters for enhancing the bondability of substrates with cyanoacrylate adhesives. Such additives may, however, significantly increase fixturing time of the cyanoacrylate adhesive composition, thereby adversely affecting the utility of the composition in specific applications, or such additives may limit the utility of cyanoacrylate compositions containing same to bonding of only specific substrate materials, without effecting any improvement in the cyanoacrylate adhesive bonding of other substrates.

Co-pending U.S. application, Ser. No. 07/168,712, filed Mar. 16, 1988, now abandoned, discloses use of tetraalkylammonium salts such as tetrabutylammonium acetate and tetrabutylammonium fluoride as cyanoacrylate primers for non-polar substrates.

The tetraalkylammonium salts, as well as many of the other primers disclosed in the above-discussed references, exhibit excellent adhesion promotion when the primer is applied and the specimen parts are bonded immediately. However, the primers disclosed above generally lose their ability to promote excellent adhesion when the primed substrate is exposed in air for a prolonged period of time. Since in many practical applications, the primed substrate is left exposed to air for a period of time before bonding, it is critical to maintain excellent adhesion promotion regardless of the amount of time the primed substrate is left in the open atmosphere.

Accordingly, it is an object of this invention to provide a primer composition that facilitates cyanoacrylate adhesive bonding of otherwise hard-to-bond substrates, such as nonpolar materials and other difficult-to-bond surfaces.

It is another object to provide a primer composition that does not deteriorate in performance upon prolonged exposure to air.

It is another object of the invention to provide a type of primer which can accommodate a variety of alkyl substituent groups in its chemical composition to variously enhance bonding to different surfaces.

Other objects and advantages of the invention will be more fully apparent from the following disclosure and appended claims.

SUMMARY OF THE INVENTION

In one aspect, this invention relates to a primer composition for bonding substrates such as non-polar plastics with cyanoacrylate adhesives. The primer comprises a polyalkylammonium alkyl carboxylate, in particular, a trialkylammonium carboxylate, of the formula:

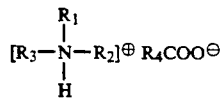

wherein $R_1$, $R_2$, $R_3$, and $R_4$ may each vary independently of the others and are selected from the group consisting of alkyl, alkenyl, alkynyl, alkylaryl, and aralkyl optionally substituted with heteroatoms, including for example, —O—, —S—, or halogen.

The term "trialkylammonium carboxylate", or any derivative thereof, as used herein, includes trialkylammonium alkyl carboxylate and trialkylammonium alkenyl carboxylate.

Preferably at least one or two, and most preferably, three, of the $R_1$, $R_2$, and $R_3$ groups are long chain alkyl moieties having 6-20, and preferably 10-16, carbon atoms in the chain. The remaining one or two of the three $R_1$, $R_2$, and $R_3$ groups can be a short chain alkyl group, generally $C_1$-$C_5$ such as methyl, when the other one or two groups are very long chain alkyl groups, generally $C_{16}$ or higher, (for example, $C_{18}$). A preferred primer carboxylate is $[(C_{12}H_{25})_3NH]^{\oplus} R_4COO^{\ominus}$.

$R_4$ preferably is an alkyl or alkenyl chain, preferably $C_6$ to $C_{20}$ alkyl, and more preferably $C_{10}$ to $C_{15}$ alkyl. Most preferably, $R_4COO^{\ominus}$ is stearate or oleate. Longer alkyl carboxylic groups appear to be less effective in enhancing adhesiveness than the compounds having groups in the preferred range, perhaps due to steric effects, while shorter alkyl carboxylate groups (such as acetate and butyrate) do not enhance open air performance of the primer, apparently due to their rapid evaporation off the substrate surface.

In another aspect, the present invention relates to a primer composition, comprising:

(a) a primer comprising (i) a trialkylammonium alkyl carboxylate of the formula:

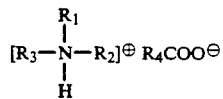

wherein $R_1$, $R_2$, $R_3$, and $R_4$ may each vary independently of the others and are selected from the group consisting of alkyl, alkenyl, alkynyl, alkylaryl, and aralkyl, optionally substituted with heteroatoms including for example, —O—, —S—, or halogen; and (ii) a nonaqueous, low surface tension organic solvent.

Preferably at least one or two, and most preferably three, of the $R_1$, $R_2$ and $R_3$ groups are $C_6$ to $C_{20}$ alkyl, and more preferably $C_{10}$ to $C_{16}$ alkyl. The remaining one or two of the three $R_1$, $R_2$, and $R_3$ groups can be a short chain alkyl group, generally $C_1$-$C_5$ such as methyl, when the other one or two groups are very long chain alkyl groups, generally $C_{16}$ or higher, (for example, $C_{18}$). A preferred primer carboxylate is $[(C_{12}H_{25})_3NH]^{\oplus}R_4COO^{\ominus}$.

$R_4$ preferably is an alkyl or alkenyl chain, preferably $C_6$ to $C_{20}$ alkyl, and more preferably $C_{10}$ to $C_{15}$ alkyl. Most preferably, $R_4COO^{\oplus}$ is stearate or oleate. Longer alkyl carboxylic groups appear to be less effective in enhancing adhesiveness than the compounds having groups in the preferred range, perhaps due to steric effects, while shorter alkyl carboxylate groups (such as acetate and butyrate) do not enhance open air performance of the primer, apparently due to their rapid evaporation off the substrate surface.

In another aspect, the present invention relates to an adhesive composition, comprising:

(a) a primer comprising (i) a trialkylammonium alkyl carboxylate of the formula:

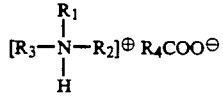

wherein $R_1$, $R_2$, $R_3$, and $R_4$ may each vary independently of the others and are selected from the group consisting of alkyl, alkenyl, alkynyl, alkylaryl, and aralkyl optionally substituted with heteroatoms including for example, —O—, —S—, or halogen; and (ii) a nonaqueous, low surface tension organic solvent; and (b) a bondant comprising a polymerizable alphacyanoacrylate monomer.

Preferably at least two, and most preferably three, of the $R_1$, $R_2$ and $R_3$ groups are $C_6$ to $C_{20}$ alkyl, and more preferably $C_{10}$ to $C_{16}$ alkyl. The remaining one or two of the three $R_1$, $R_2$, and $R_3$ groups can be a short chain alkyl group, generally $C_1$-$C_5$ such as methyl, when the other one or two groups are very long chain alkyl groups, generally $C_{16}$ or higher, (for example, $C_{18}$). A preferred primer carboxylate is $[(C_{12}H_{25})_3NH]^{\oplus}R_4COO^{\ominus}$.

$R_4$ preferably is an alkyl or alkenyl chain, preferably $C_6$ to $C_{20}$ alkyl, and more preferably $C_{10}$ to $C_{15}$ alkyl. Most preferably, $R_4COO^{\oplus}$ is stearate or oleate. Longer alkyl carboxylic groups appear to be less effective in enhancing adhesiveness than the compounds having groups in the preferred range, perhaps due to steric effects, while shorter alkyl carboxylate groups (such as acetate and butyrate) do not enhance open air performance of the primer, apparently due to their rapid evaporation off the substrate surface.

Preferred solvents are isopropanol (IPA) and FREON® TMS. IPA is preferred because of its superior environmental and low toxicity characteristics. An advantage of the FREON® TMS is its rapid evaporation and non-flammability.

Another aspect of the invention relates to a method for adhesively bonding a substrate element with an alpha-cyanoacrylate bondant, comprising:

(a) applying an adhesion enhancingly effective coupling agent to a surface of the substrate element to be adhesively bonded, said coupling agent being of the formula:

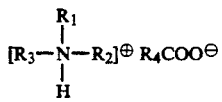

wherein $R_1$, $R_2$, $R_3$, and $R_4$ may each vary independently of the others and are selected from the group consisting of alkyl, alkenyl, alkynyl, alkylaryl, and aralkyl, optionally substituted with heteroatoms; and (b) applying the bondant to the substrate.

Preferably, at least two, and most preferably three, of the $R_1$, $R_2$ and $R_3$ groups are a $C_6$ to $C_{20}$ alkyl or alkenyl, and most preferably a $C_{10}$ to $C_{16}$ alkyl or alkenyl. The remaining one or two of the three $R_1$, $R_2$, and $R_3$ groups can be a short chain alkyl group, generally $C_1$-$C_5$ such as methyl, when the other one or two groups are very long chain alkyl groups, generally $C_{16}$ or higher, (for example, $C_{18}$). A preferred primer carboxyate is $[C_{12}H_{25})_3NH]^{\ominus}R_4COO^{\oplus}$.

$R_4$ preferably is an alkyl or alkenyl chain, preferably $C_6$ to $C_{20}$ alkyl, and more preferably $C_{10}$ to $C_{15}$ alkyl. Most preferably, $R_4COO^{\ominus}$ is stearate or oleate. Longer alkyl carboxylic groups appear to be less effective in enhancing adhesiveness than the compounds having groups in the preferred range, perhaps due to steric effects, while shorter alkyl carboxylate groups (such as acetate and butyrate) do not enhance open air performance of the primer, apparently due to their rapid evaporation off the substrate surface.

A further aspect of the invention relates to a bonded assembly comprising a substrate element with a surface having coated thereon an adhesion enhancingly effective coupling agent as described above, with he surface coated with such coupling agent being adhesively bonded in the assembly by an alpha alkyl-cyanoacrylate bondant.

Other aspects and features of the invention will be more fully apparent from the ensuing disclosure and appended claims.

DETAILED DESCRIPTION OF THE INVENTION, AND PREFERRED EMBODIMENTS THEREOF

Figure 1:
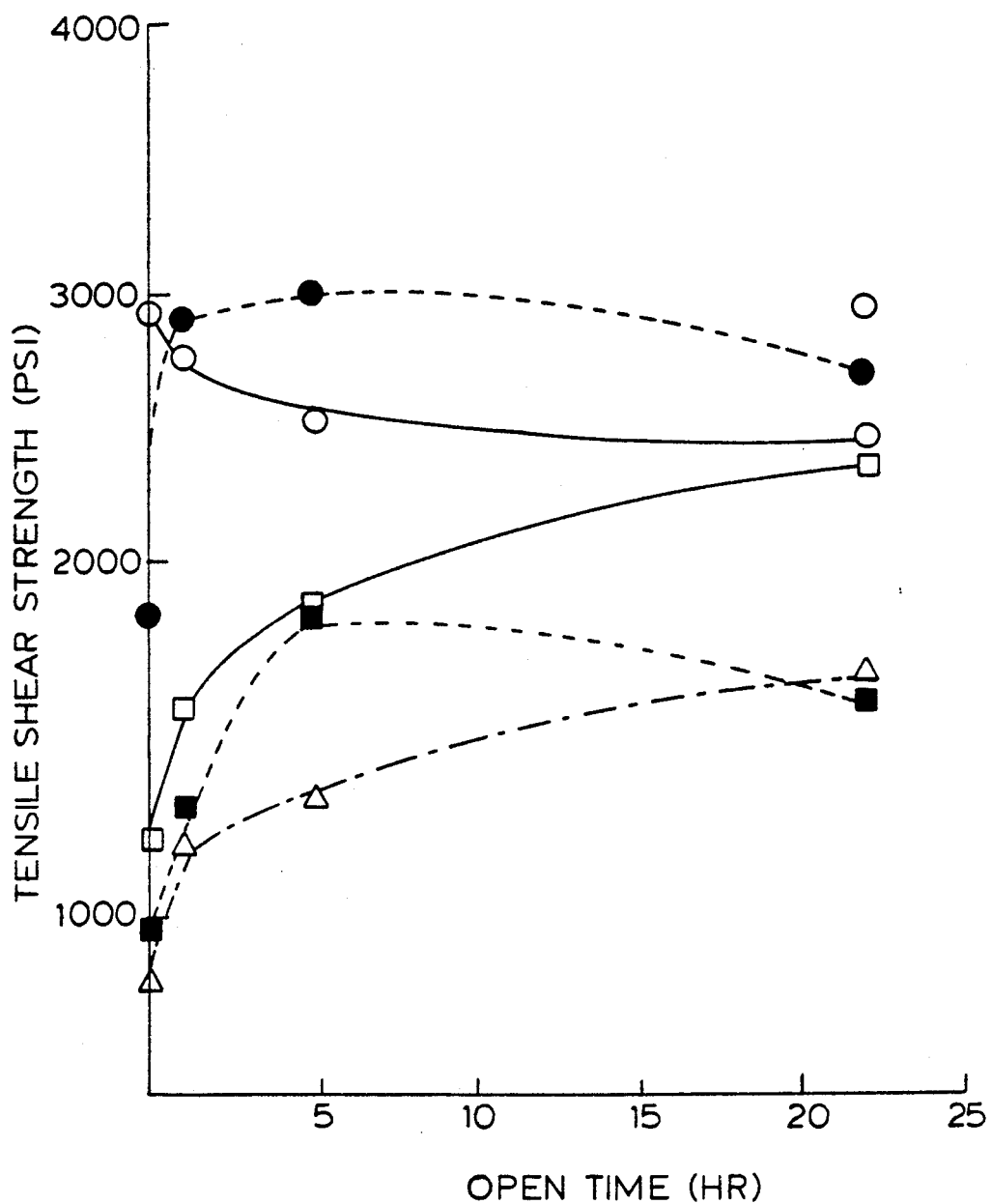
FIG. 1 is a graph of the results of an open time test (tensile shear strength) on a distearylmethylammonium stearate primer in an IPA solvent at varying concentrations, in which —○— indicates 0.05% primer, —●— indicates 0.1% primer, —□— indicates 0.25% primer, —■— indicates 0.5% primer and —△— indicates 1.0% primer.

The carboxylate primer compounds of the invention may be suitably formed by reaction between an tertiary amine and a alkyl carboxylic acid to form the tertiary alkyl ammonium alkyl carboxylate salt.

The primer compounds of the invention include those having the formula:

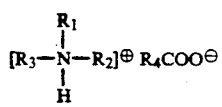

wherein $R_1$, $R_2$, $R_3$, and $R_4$ may each vary independently of the others and are selected from the group consisting of alkyl, alkenyl, alkynyl, alkylaryl, and aralkyl, optionally substituted with heteroatoms including for example, —O—, —S—, or halogen. Such compounds have been found to effectively enhance adhesion of alpha alkyl-cyanoacrylate bondants to certain substrate surfaces as compared to corresponding bonding systems lacking such primer compounds. Furthermore, these primer compounds retain their performance characteristics even after prolonged exposure to open air.

Preferably at least one or two, and most preferably, three, of the $R_1$, $R_2$, and $R_3$ groups are long chain alkyl moieties having 6-20 and most preferably 10-16 carbons in the chain; the remaining group(s) preferably are constituted by short chain alkyl radicals such as methyl when the other two groups have a high number of carbons within the aforementioned ranges. For example, in one preferred embodiment, $R_1$ and $R_2$ are stearyl groups and $R_3$ is a methyl group. A preferred primer embodiment, wherein all three substituents of the ammonium cation are of the same chain length, is tridodecylammonium stearate.

In the primers of the above formula, $R_1$, $R_2$, $R_3$ and $R_4$ may be, by way of example, $C_6$-$C_{20}$ alkyl and preferably are $C_{10}$-$C_{16}$ alkyl, with dodecyl being preferred when $R_1=R_2=R_3$, and either dodecyl or more preferably, stearyl being preferred when one of $R_1$, $R_2$, or $R_3$ is not a long chain. The preferred alkyl groups may be either straight-chained or branched. If the groups are branched, it is preferred that such branching be at the outer portion of the group to avoid undesirable steric effects. Most preferably, $R_4COO^{\ominus}$ is stearate or oleate.

A tetraalkylcarboxylate is not a preferred primer compound because it readily forms the corresponding hydroxide during exposure, particularly long term exposure, to the atmosphere which is detrimental to adhesion of the cyanoacrylate adhesive.

As used herein, the term "adhesiveness" refers to the adhesive affinity of a substrate surface for an alpha-cyanoacrylate bondant. "Adhesion enhancing" or "adhesion enhancingly effective" with reference to a primer means that such compound effects a higher degree of adhesiveness of the cyanoacrylate bondant to the substrate surface than would be realized in the absence of the primer compound.

The above-described primers may be employed as adhesion enhancingly effective coupling agents for numerous hard-to-bond substrate surfaces. The preferred method of application of the primer is in the form of a solution of the primer in a carrier medium. A low surface-tension, nonaqueous, organic solvent is a preferred carrier. Most preferred among such solvents are isopropanol (IPA), especially anhydrous IPA, FREON® TMS (trichlorofluoroethane with 3.5% methanol and 0.5% nitromethane), or toluene or other solvents that will dissolve the primer and will readily evaporate from the primed substrate surface within a reasonable time (e.g., about 1 minute). The primer of the invention functions best when the surface free energy of the solvent is close to that of the substrate surface to be adhesively bonded. The solvent may be either a single component solvent or a multicomponent solvent mixture.

The most preferred primer compounds comprise trialkylammonium alkyl carboxylates such as distearylmethylammonium stearate, distearylmethylammonium oleate and tridodecylammonium stearate. The primer compounds may be advantageously employed in the solvents discussed above, at a concentration of from about 0.05% to about 1.0% weight/volume of the solvent, preferably at a concentration of about 0.25% weight/volume solvent. The adhesion enhancingly effective concentration of a particular primer-solvent composition, may be determined on a particular surface by determining the tensile shear strength. It is preferred generally to apply the primer at the lowest possible concentration to decrease cost and increase ease of application. Such a "thin" application also desirably allows the applied primer to be as close as possible in thickness to a monomolecular layer.

The primer solution comprising the primer and the solvent carrier medium may be applied to the substrate surface to be bonded with the cyanoacrylate adhesive in any manner that is satisfactory to effect enhanced adhesion of the cyanoacrylate bondant to the substrate, as for example, by spraying, dipping, brushing, swabbing, wiping, rollercoating, etc. One or both surfaces may be primed if both surfaces are the hard-to-bond surfaces for which the invention is particularly useful. If only one such substrate is used, at least that surface should be treated with primer. After the primer solution is applied to the substrate surface(s) to be adhesively bonded, the cyanoacrylate adhesive composition may be applied to one or both of the primer-treated surfaces. The substrates then are brought together to effect adhesive bonding of the substrate elements and to form the bonded assembly.

The thickness of the primer layer and adhesive layer may vary widely depending on the character and composition of the substrate surfaces to be bonded, the particular adhesive and primer employed, and the nature of the end use of the bonded assembly. With any given set of parameters, acceptable and optimum thicknesses may be determined by lapshear tensile shear strength determinations on the particular samples at different thicknesses of primer and adhesive layers. Cyanoacrylate thicknesses of from about 5 to about 10 mils have been found generally satisfactory with polyolefin and rubber-modified olefin substrates. Typically, one application of the primer is sufficient, but multiple coatings may be applied.

The substrates with which the primer of the invention is useful include in enhancing the adhesion of cyanoacrylate bondants, include: polyolefins, such as polypropylene, polyethylene, and polybutylene; EDPM rubber; composite rubber materials, such as the microdispersed polypropylene/EDPM rubber material commercially available under the trade name SANTOPRENER from Monsanto Company (St. Louis, MO); polyacetals; polyesters, such as polybutene terephthalate; polyamides such as nylon; fluorocarbon polymers such as TEFLON ® polytetrafluoroethylene (E.I. duPont de Nemours and Company, Inc., Wilmington, DE); and combinations and composites of such materials, and copolymers of the monomers of such polymers. Most preferred as substrates for cyanoacrylate bonding with the primer of the invention are those comprising polyolefins, because these substrates generally are particularly difficult to bond with cyanoacrylate adhesives.

In addition to the abovementioned substrate materials of construction, which are illustratively set forth and are not to be limitingly construed, these hard-to-bond substrate materials may be treated with the primer of the invention before bonding same to other more easily bonded substrate materials of construction such as metal, glass, leather, ceramic, stone, fabric, wood, paper, and combinations and composites thereof. It may thus be suitable to bond a low surface energy substrate to a second surface having a higher surface energy, the primer being applied to the low energy surface to enhance adhesive bonding by the cyanoacrylate adhesive to the low surface energy surface.

The primers of the invention may be utilized in combination with any other additives or components which do not preclude the efficacy of the primers for their intended purpose. For example, potential additive components include, but are not limited to, antioxidants, stabilizers, plasticizers, surfactants, anti-corrosion materials, and fluorescent dyes (for primer coverage verification under fluorescent illumination of the primed surface).

The cyanoacrylate adhesive compositions that may be used in the practice of the present invention include any suitable cyanoacrylate compositions that are compatible with the primers of the invention and the substrate material(s) to be adhesively bonded. Illustrative cyanoacrylate adhesive compositions include, but are not limited to, the cyanoacrylate adhesive compositions disclosed in the following U.S. Pat. Nos. 4,386,193; 4,170,585; 4,424,387; 4,321,180; 4,196,271; 3,699,127; and 3,836,377.

The features and advantages of the present invention will be more clearly understood by reference to the following examples, which are not to be construed as limiting the invention.

EXAMPLE I

Open air test experiments were conducted with various primer agents within and outside the scope of the present invention, including alkyl amines, e.g., long chain alkyl amines and trialkylammonium alkyl carboxylates. The procedure for performing the open air test experiments was as follows.

Polypropylene specimens (2 cm×2 cm×0.5 cm) were conditioned prior to application of cyanoacrylate by dipping the specimens briefly into solvents including toluene and dichloromethane and wiping off the excess solvent.

The primer was dissolved in the solvent of choice which unless otherwise indicated was isopropanol (IPA). IPA appears to be a highly suitable solvent from the point of view of environmental considerations, toxicity, and volatility. The primer to be tested was applied to each of a plurality of specimens with a cotton swab by rubbing the specimens twice, and the specimens were exposed in air for the specified time period. Two or three drops of ethyl cyanoacrylate monomer were applied to one of a pair of treated specimens, the pair was then joined for bonding, and finger tight pressure was applied. The bonded specimens were allowed to stand at ambient temperature in the open atmosphere for a minimum of 24 hours after assembly. The strength of adhesiveness was measured by the lap shear strength determination method of ASTM D-4502 STM-650. These procedures were used in all of the following examples, unless otherwise indicated.

A distearylmethylammonium stearate primer was applied to each polypropylene specimen according to the above open air test procedure. The concentration of primer in isopropanol solvent ranged from 0.05% to 1.0%. As shown in FIG. 1, little or no performance deterioration was observed at 0.1% and 0.05% primer concentrations and the performance was excellent even after overnight exposure.

EXAMPLE II

Figure 2:
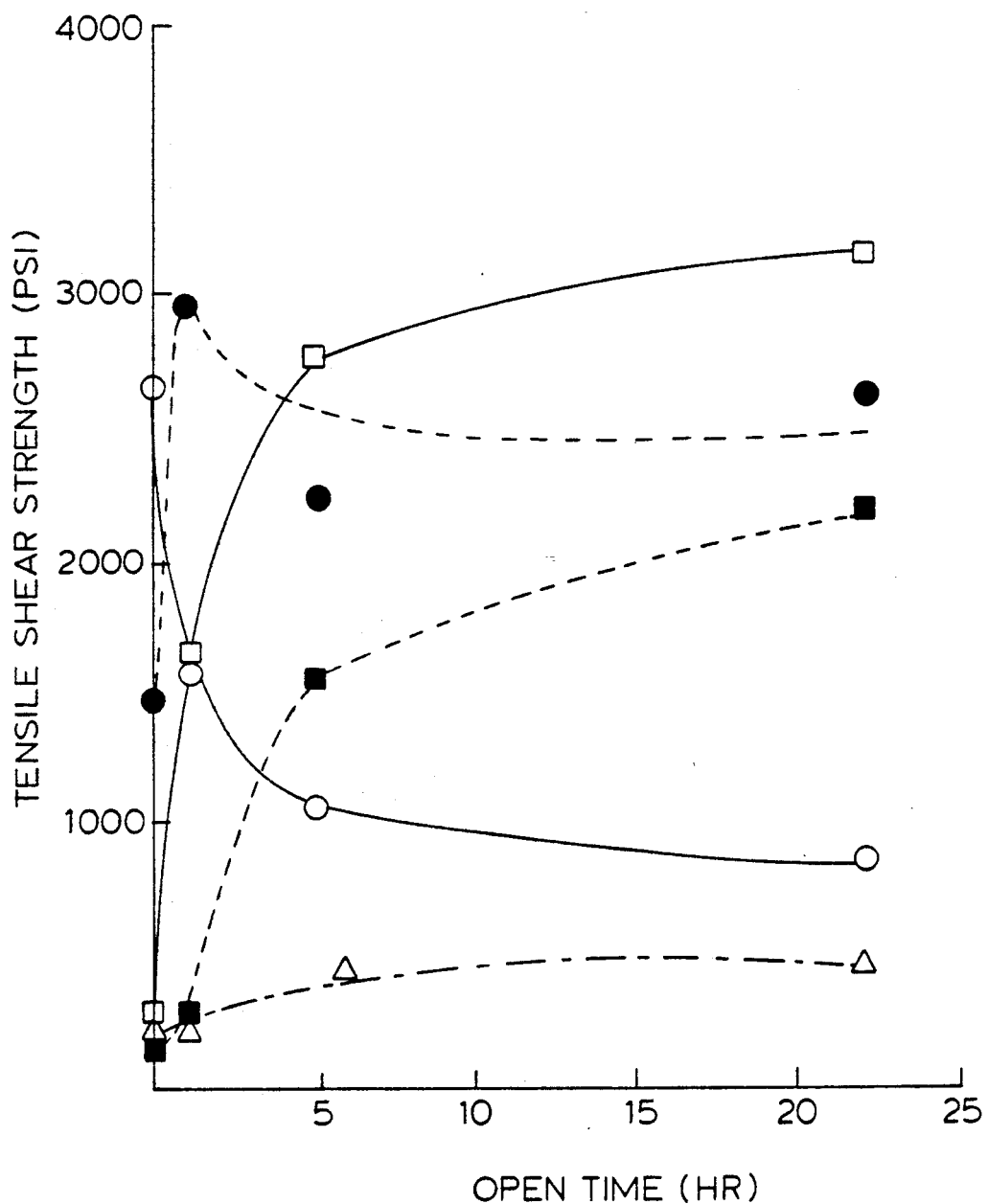
FIG. 2 is a graph of the results of an open time test on a distearylmethylammonium oleate primer at varying concentrations, in which —○— indicates 0.05% primer, —●— indicates 0.1% primer, —□— indicates 0.25% primer, —■— indicates 0.5% primer, and —△— indicates 1.0% primer.

The procedures of Example I were employed utilizing as the primer, distearylmethylammonium oleate, which has a C=C unsaturation (FIG. 2). Little performance deterioration of the primer was observed, indicating that unsaturation of the $R_4$ group was not deleterious to adhesion enhancement.

EXAMPLE II

Figure 3:
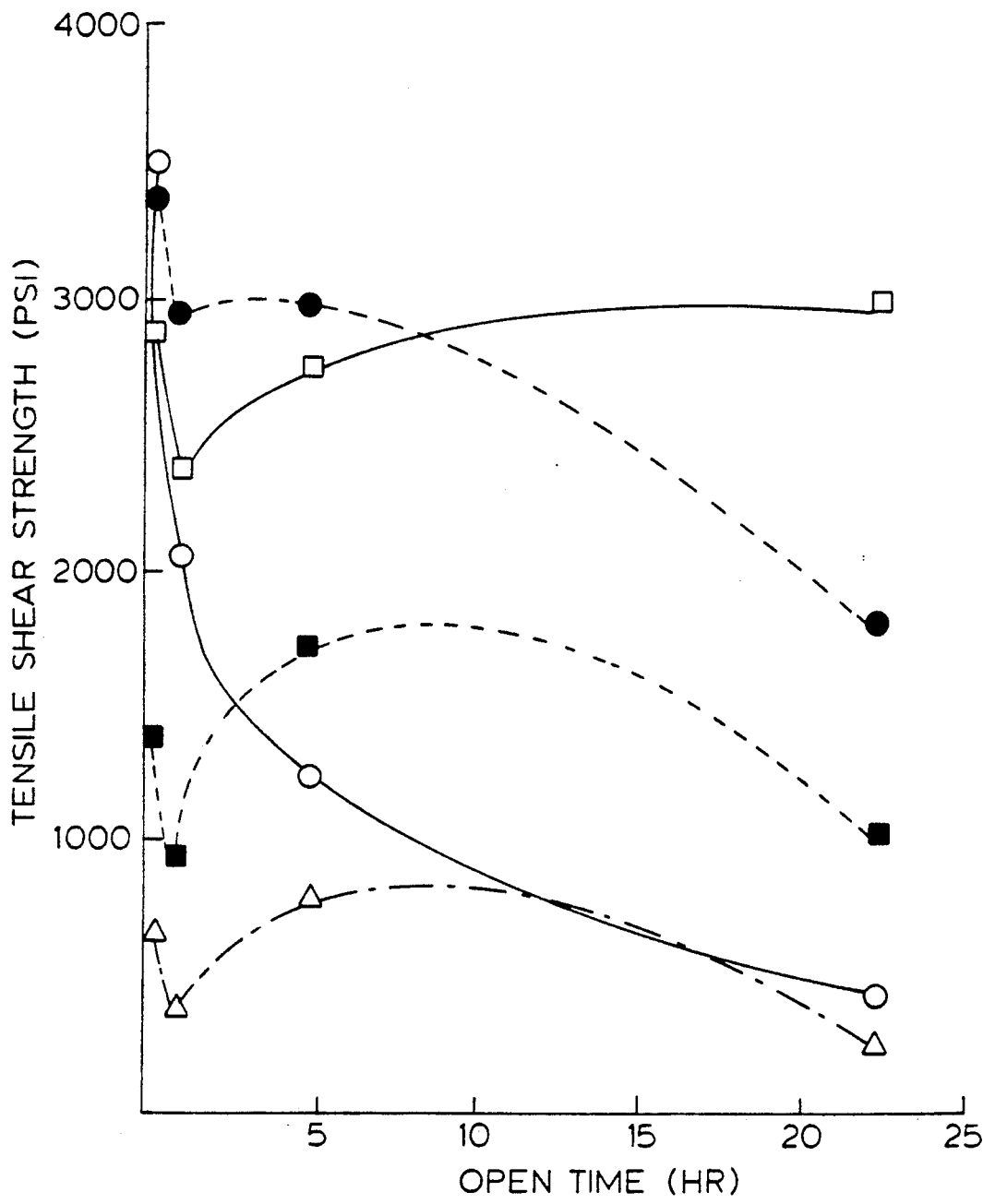
FIG. 3 is a graph of the results of an open time test on a tridodecylammmonium stearate primer in an IPA solvent at varying concentrations, in which —○— indicates 0.05% primer, —●— indicates 0.1% primer, —□— indicates 0.25% primer, —■— indicates 0.5% primer, and —△— indicates 1.0% primer.

The procedures of Example I were employed with tridodecylammonium stearate using an isopropanol solvent and the standard polypropylene specimens. As shown in FIG. 3, 0.25% tridodecylammmonium stearate persisted in a high level of performance over the time period tested. Lower tensile shear strength was seen at the remaining concentrations.

EXAMPLE IV

Figure 4:
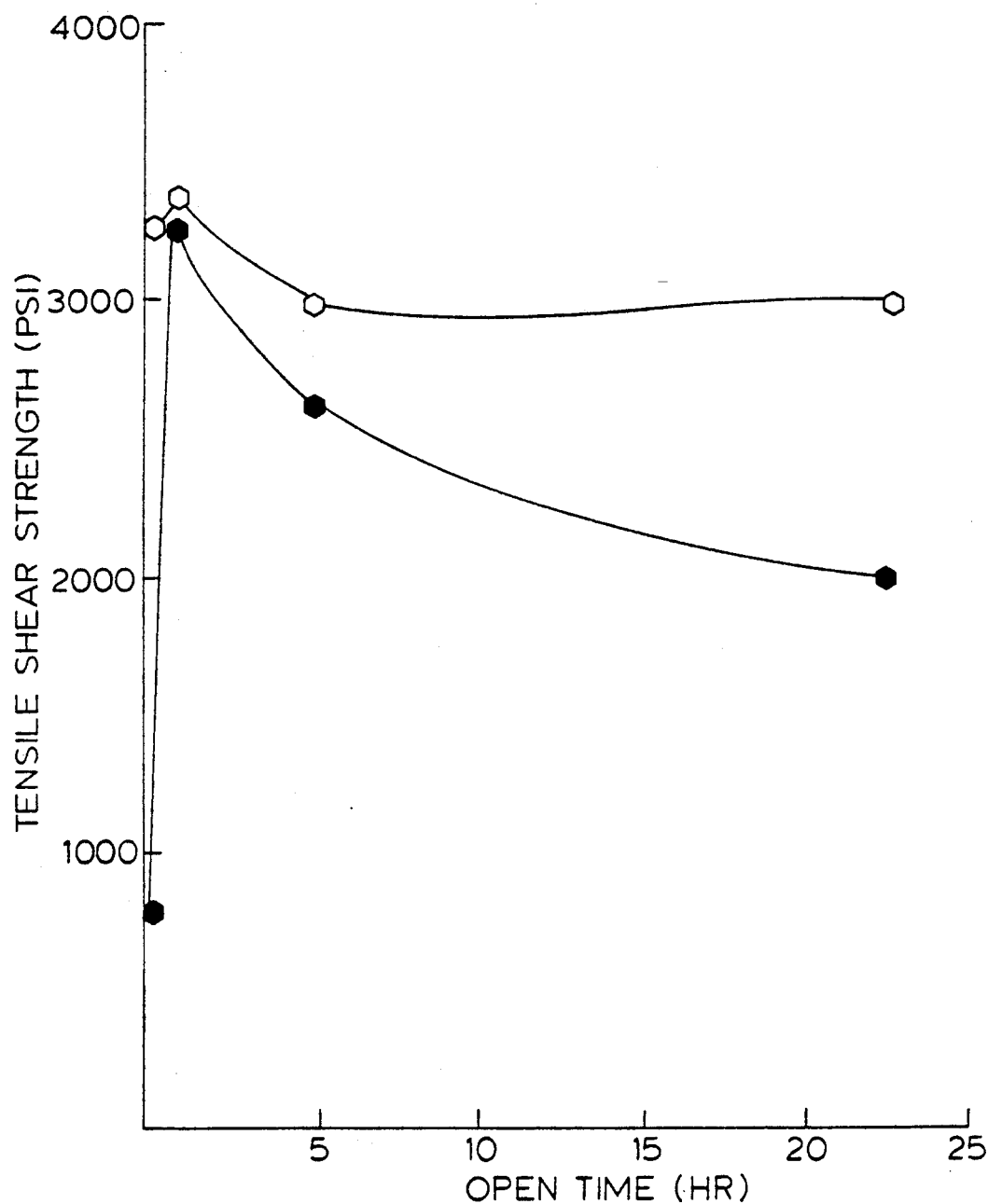
FIG. 4 is a graph of the results of an open time test on tridodecylammmonium stearate and tridodecylammonium oleate primers used with a 10 mil gap. In this figure, —○— indicates 0.25% tridodecylammonium stearate, and —●— indicates 0.25% tridodecylammonium oleate.

The enhanced performance of tridodecylammmonium stearate and tridodecylammonium oleate was evident even with a 10 mil gap when these primer compositions were tested according to Example III with 0.25% tridodecylammonium stearate and 0.25% tridodecylammonium oleate (FIG. 4).

EXAMPLE V

Figure 5:
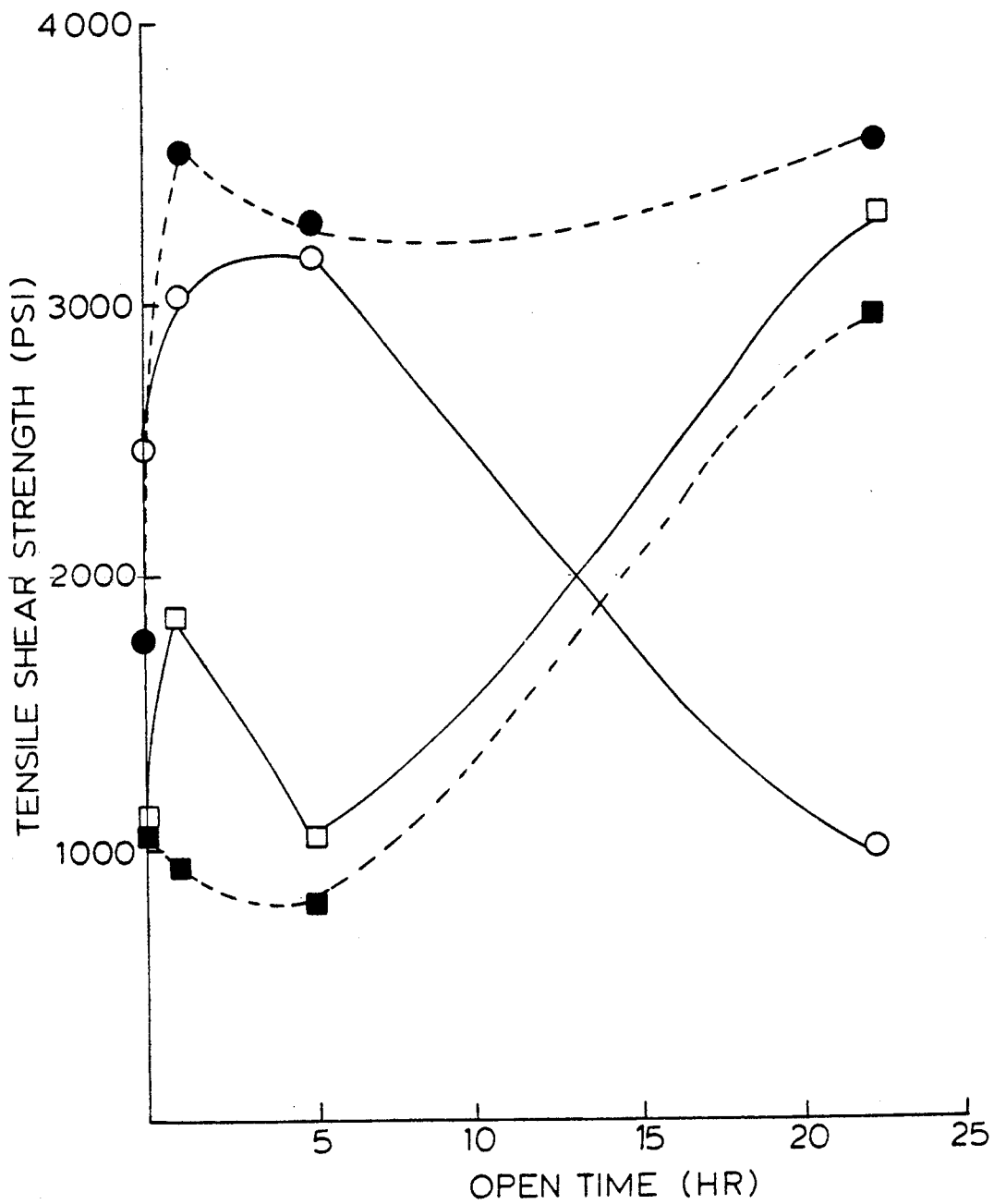
FIG. 5 is a graph of the results of an open time test on a tridodecylammmonium palmitate primer in an IPA solvent at varying concentrations, in which —○— indicates 0.05% primer, —●— indicates 0.1% primer, —□— indicates 0.25% primer, and —■— indicates 0.5% primer.

Performance of tridodecylammmonium palmitate in isopropanol when tested according to the procedure of Example I was a maximum initially at a 0.1% concentration of the carboxylate (FIG. 5). With time, the performance 0.25 and 0.5% carboxylate increased and was approximately equivalent to that at 0.1%.

EXAMPLE VI

Figure 6:
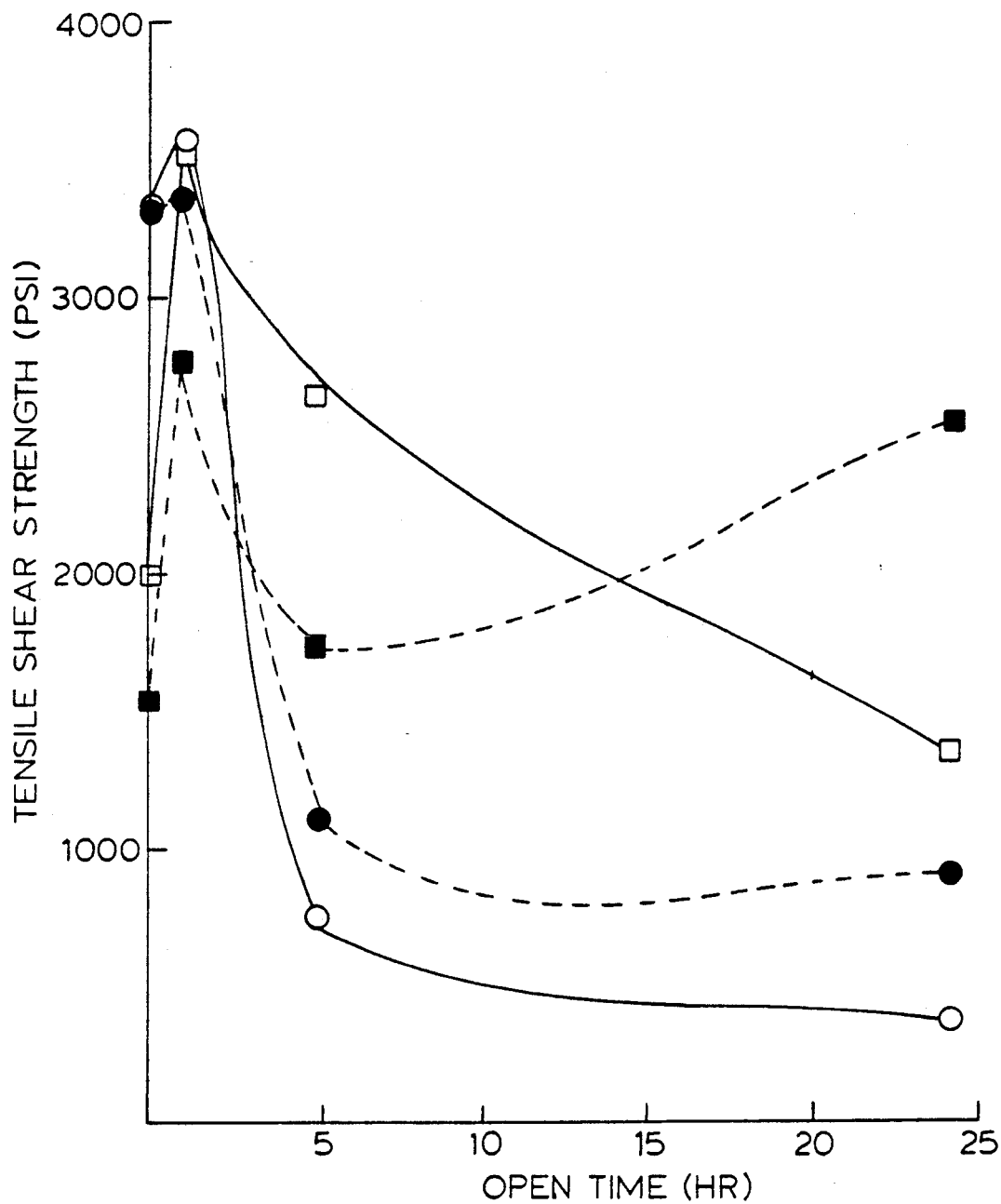
FIG. 6 is a graph of the results of an open time test on tridodecylamine primer in toluene in which —○— indicates 0.05% primer, —●— indicates 0.1% primer, —□— indicates 0.25% primer and —■— indicates 0.5% primer.

Tridodecylammmonium stearate in toluene did not have as persistent a performance as the carboxylate primers of Examples III-V in IPA (FIG. 6).

EXAMPLE VII

Examination of adhesion enhancement of the tertiary ammonium alkyl carboxylate salts possessing short alkyl chains on the amine group, such as triethylammonium acetate and triethylammonium stearate, indicated that the performance of these primers is very poor, the compression strength generally being well below 1000 psi at the time periods and concentrations tested (results not shown).

EXAMPLE VIII

Figure 7:
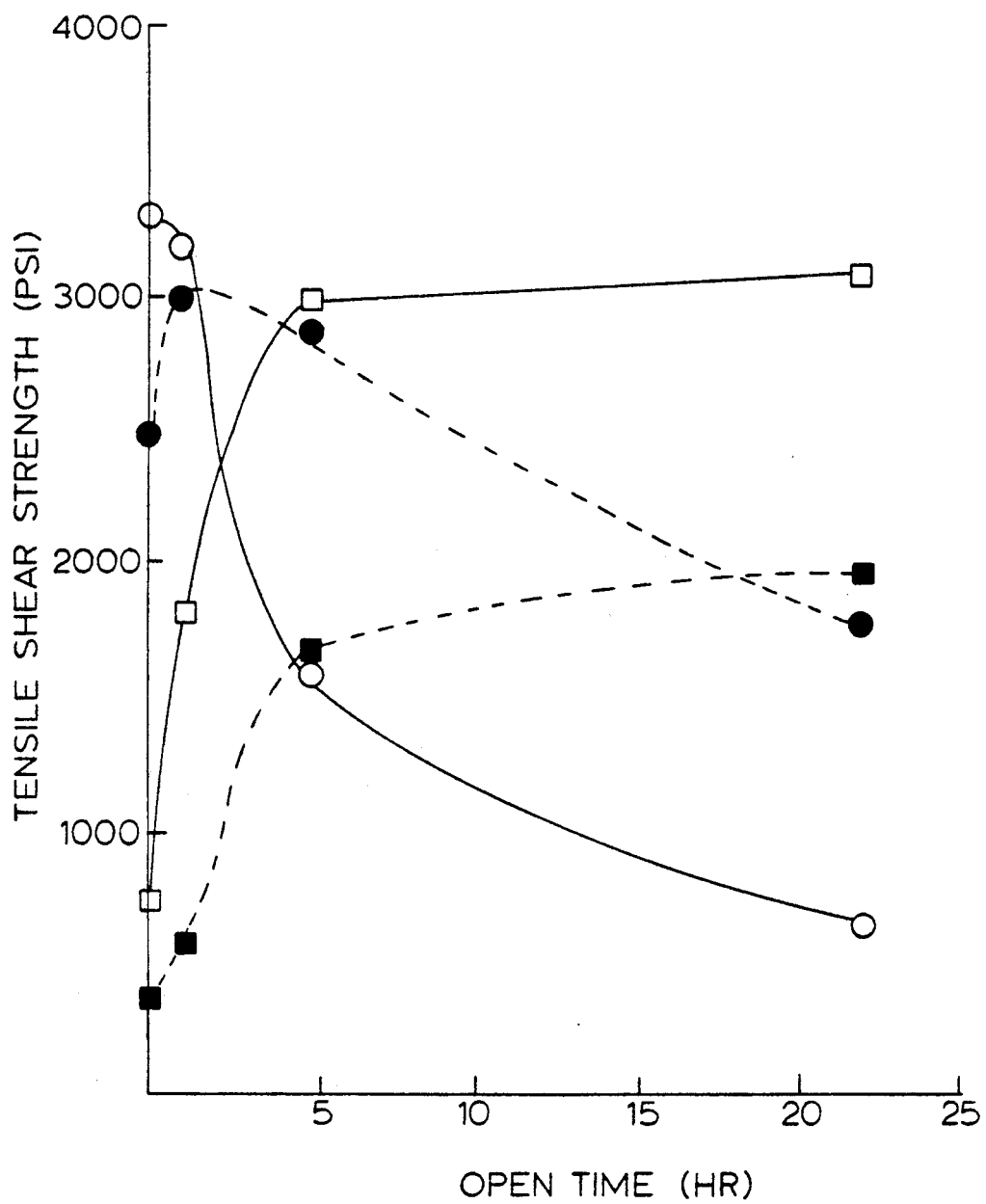
FIG. 7 is a graph of the results of an open time test on a distearylmethylammonium acetate primer at varying concentrations, in which —○— indicates 0.05% primer, —●— indicates 0.1% primer, —□— indicates 0.25% primer and —■— indicates 0.5% primer.

The open air adhesion performance of trialkylammonium alkyl carboxylates wherein the carboxylic acid ester constituent is a short chain acid ester, such as distearylmethylammonium acetate, distearylmethylammonium butyrate and distearylmethylammonium octanoate, was tested according to the procedures of Example I. Unlike the preferred longer chain carboxylates (Examples I-V), these three compounds showed enhanced initial tensile shear strength and long term bond strength only at 0.25% primer concentration, similar to the results shown in Example XI for distearylmethylamine. An example of the results for acetate are shown in FIG. 7. One explanation for the decreased compression strength with time with the more volatile substituents, which was confirmed with IR spectral analysis (results not shown), is evaporation of the carboxylic acid.

EXAMPLE IX

Figure 8:
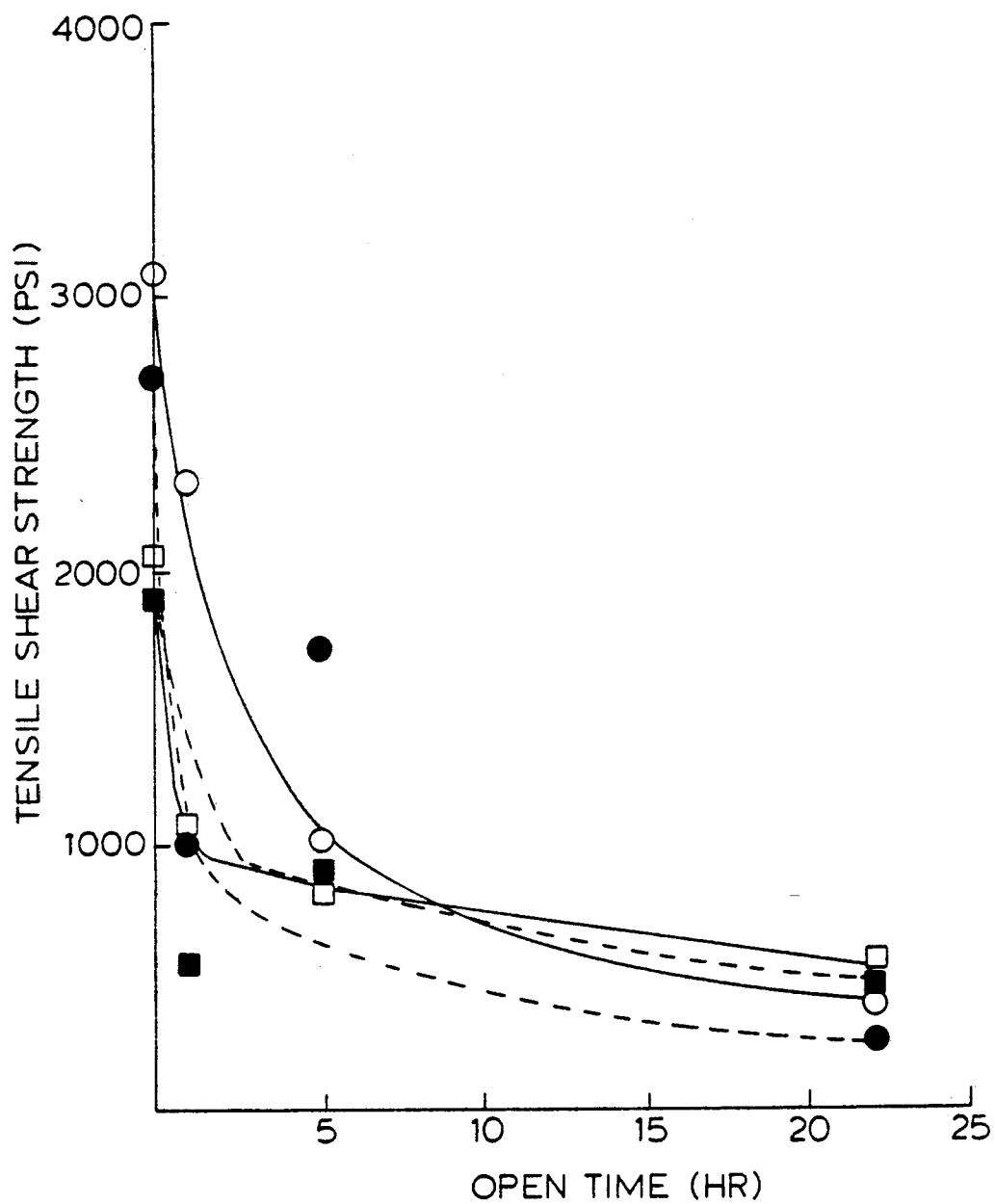
FIG. 8 is a graph of the results of an open time test on a tetrabutylammonium fluoride primer at varying concentrations, in which —○— indicates 0.05% primer, —●— indicates 0.1% primer, —□— indicates 0.25% primer and —■— indicates 0.5% primer.

The long term adhesive enhancing performance of two tetraalkylammonium salts was compared to that of the trialkylammonium alkyl carboxylates and the alkyl amines. Utilizing the procedure of Example I, tetrabutylammonium fluoride (TBAF) and tetrabutylammonium acetate (TBAA) were subjected to the open time test. As shown in FIG. 8, for air exposure of TBAF, the performance of TBAF was initially excellent at a concentration of 0.05% and 0.1%, however, deterioration was rapid, as compared to the primer of the present invention, at all concentrations. The results with TBAA in moist air were essentially identical to those of TBAF.

EXAMPLE X

Figure 9:
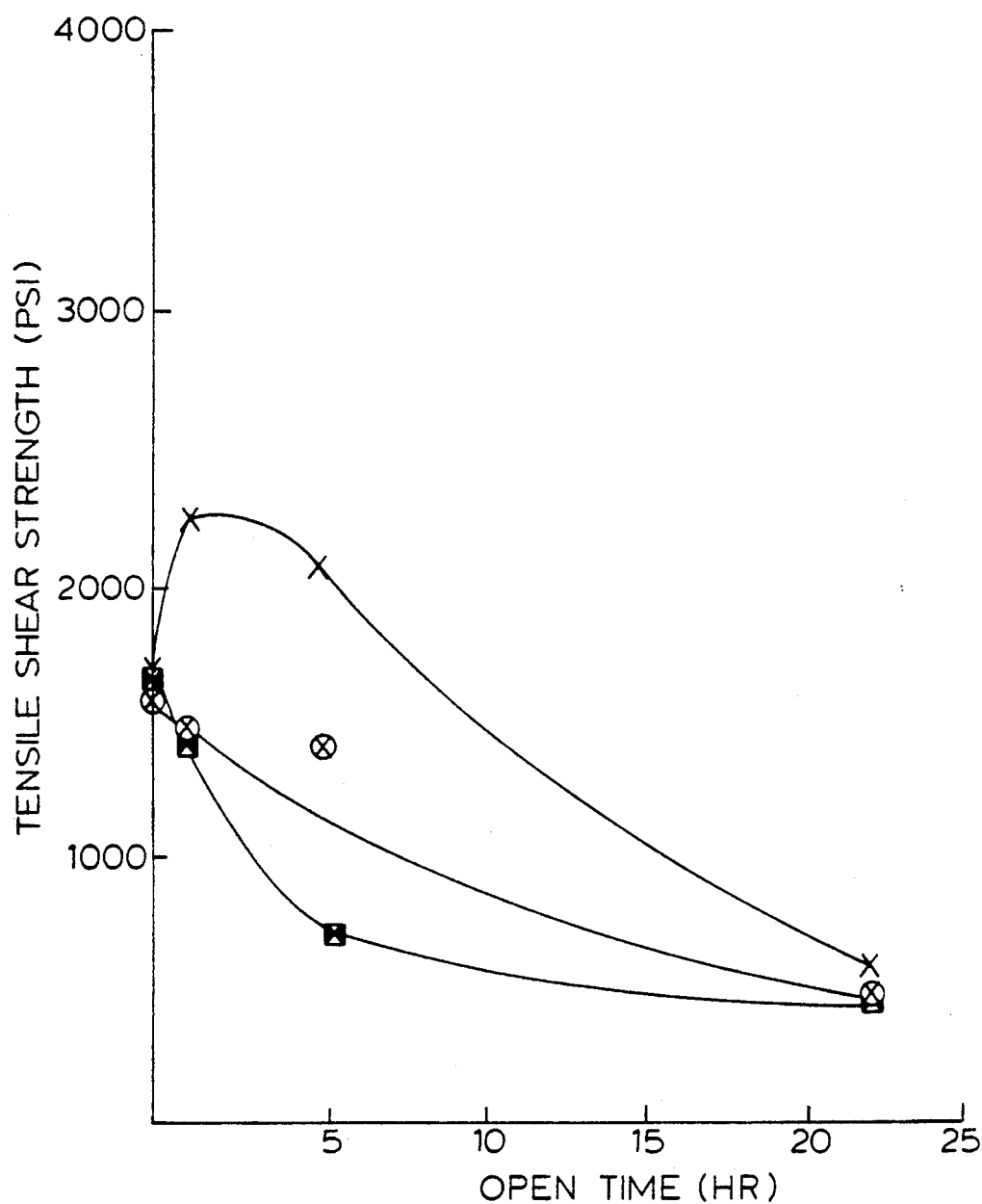
FIG. 9 is a graph of the results of an open time test on 0.05% tetrabutylammonium octanoate (——⊗——), tetrabutylammonium stearate (——▣——) and methyltrioctylammonium stearate (——×——) primer.

Long chain tetraalkylammonium alkyl carboxylate salts were examined for long term adhesive enhancing performance. In particular, tetrabutylammonium octanoate (TO), tetrabutylammonium stearate (TS), and methyltrioctylammonium stearate (MS) were tested according to the procedures of Example I. The results at 0.05% primer concentration are shown in FIG. 9 and were similar to those with TBAA and TBAF (Example IX). The results at the higher concentrations were generally also similar to the results with TBAA and TBAF.

EXAMPLE XI

Figure 10:
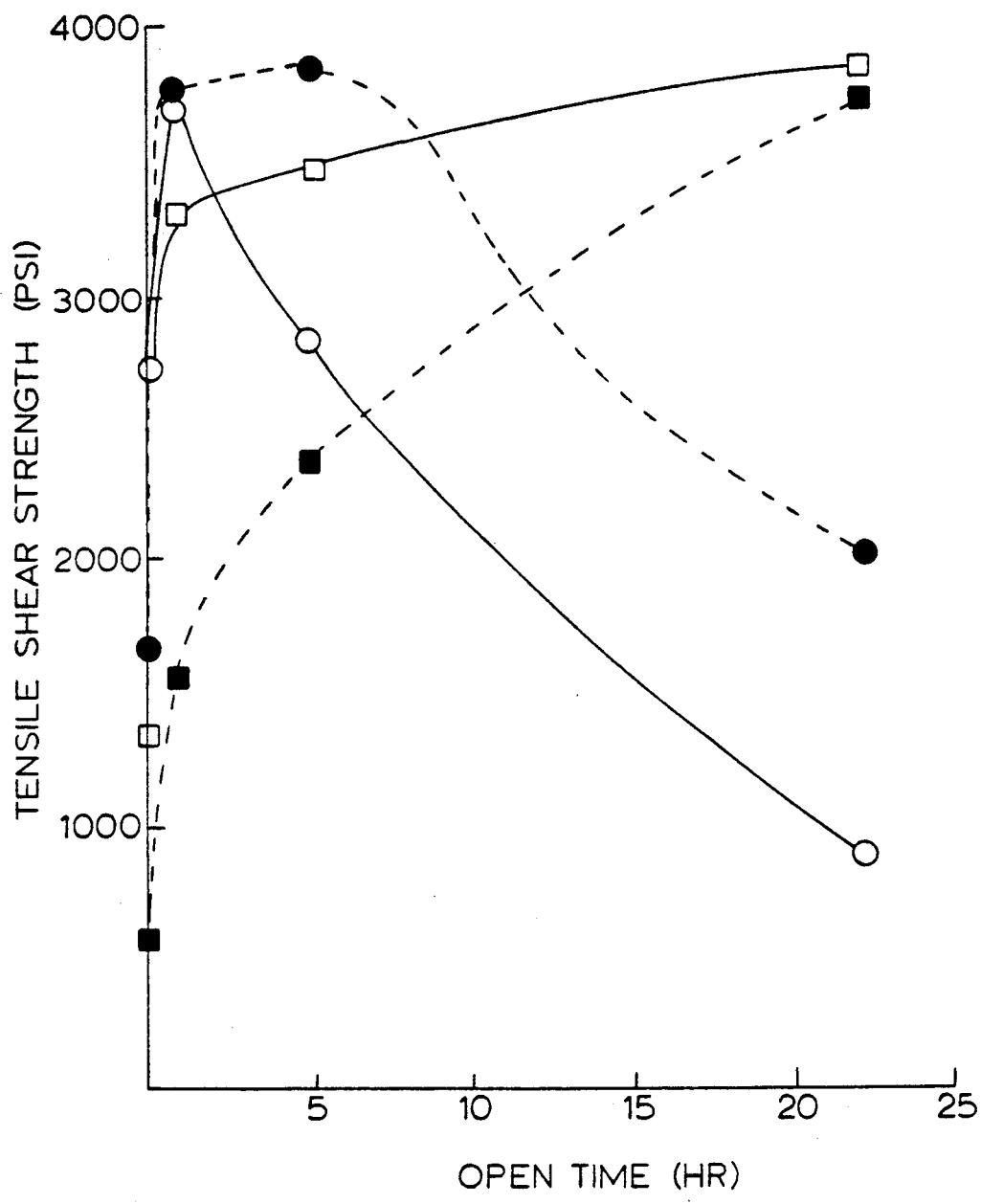
FIG. 10 is a graph of the adhesion results (tensile shear strength) of an open time test on a distearylmethylamine primer at varying concentrations, in which —○— indicates 0.05% primer —●— indicates 0.1% primer, —□— indicates 0.25% primer and —■— indicates 0.5% primer.

The long term performance of distearylmethylamine was tested according to the procedure of Example I. The results shown in FIG. 10 are similar to those of Example VIII for tertiary ammonium carboxylate salts with short alkyl chains on the amine group, where the performance was poor. Only one concentration (0.25% primer in IPA) showed excellent bond strength a day after exposure.

EXAMPLE XII

Figure 11:
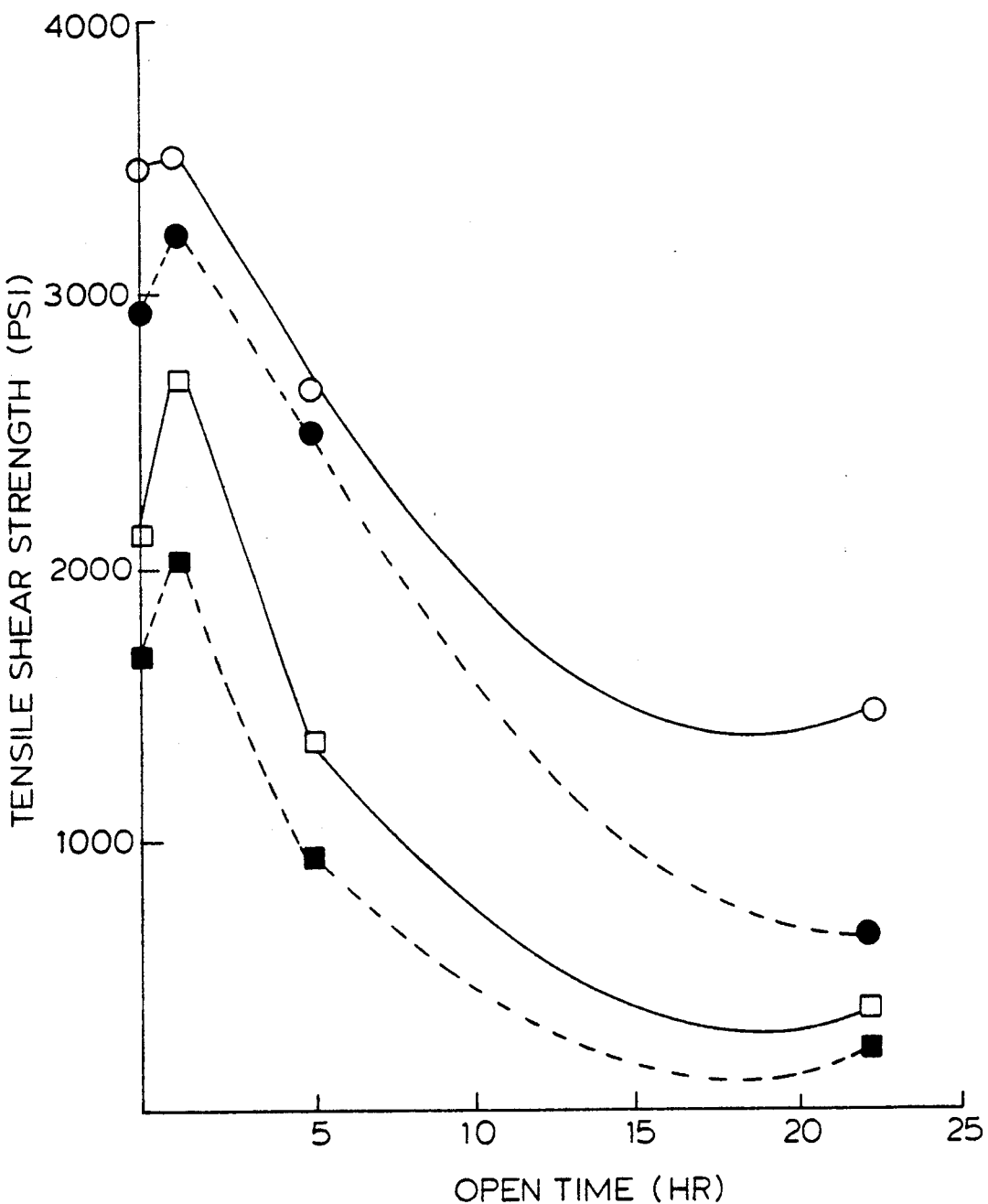
FIG. 11 is a graph of the results of an open time test on a tristearylammonium stearate primer at varying concentrations, in which —○— indicates 0.05% primer, —●— indicates 0.1% primer, —□— indicates 0.25% primer, and —■— indicates 0.5% primer.

The procedures of Example I were employed utilizing as the primer, tristearyl ammonium stearate in a toluene solvent. The results are shown in FIG. 11. Initial adhesion enhancement was high at 0.1% and 0.05% primer concentrations, but there was a decline in performance at all primer concentrations after overnight exposure.

EXAMPLE XIII

Figure 12:
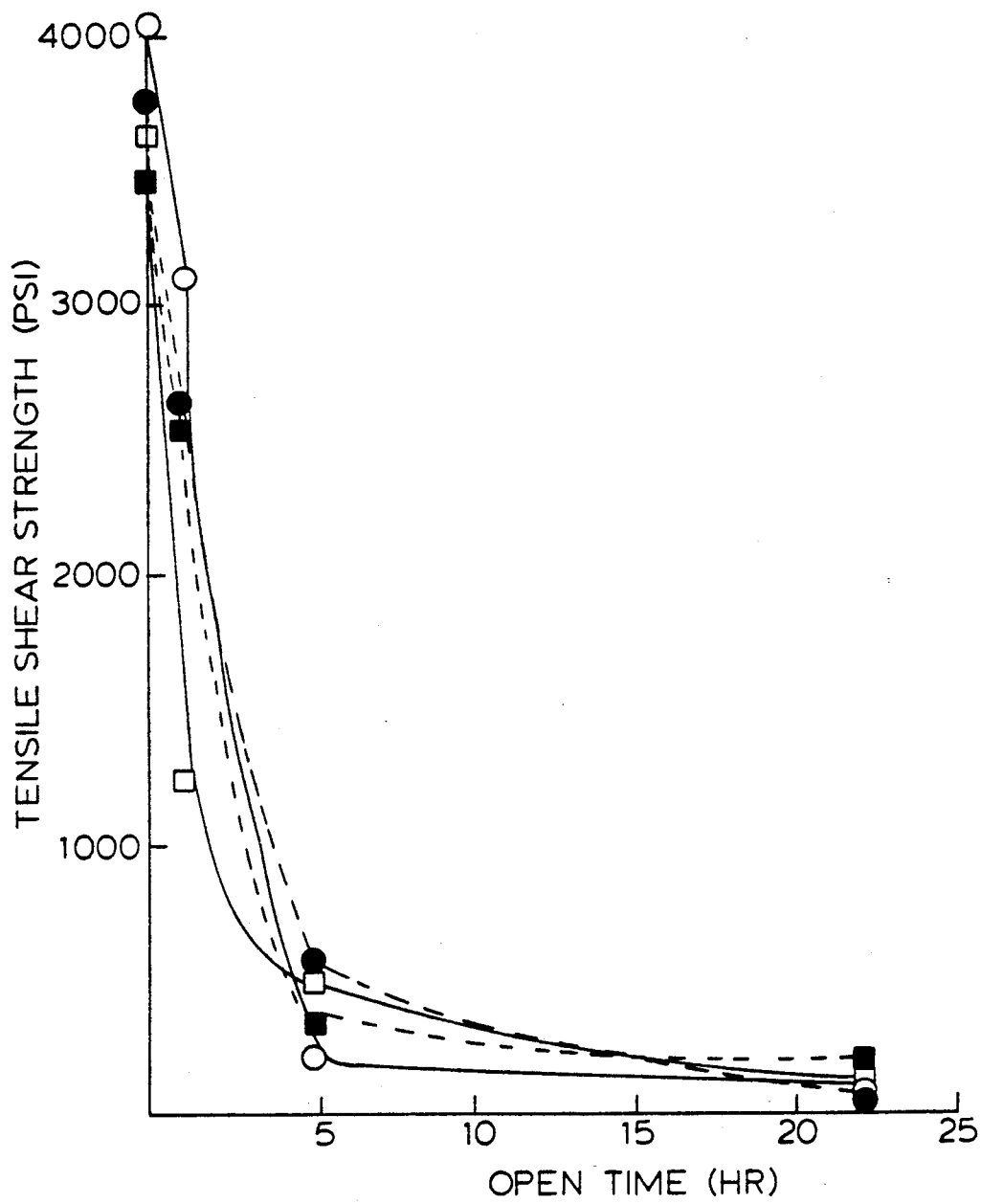
FIG. 12 is a graph of the results of an open time test on a triphenyl phosphine primer at varying concentrations, in which —○— indicates 0.05% primer, —●— indicates 0.1% primer, —□— indicates 0.25% primer and —■— indicates 0.5% primer.

The long term open air performance of triphenyl phosphine (TTP), a common primer used for non-polar surfaces, was measured using the procedures of Example I. As shown in FIG. 12, TPP deteriorates rapidly under the conditions of exposure of these experiments. Results performed with TPP in a dry $N_2$ atmosphere, showed significant improvement with almost no deterioration at 0.5% TPP, supporting the theory that the poor performance of TPP upon prolonged exposure to air is due to the formation of triphenylphosphine oxide by air oxidation.

EXAMPLE XIV

Figure 13:
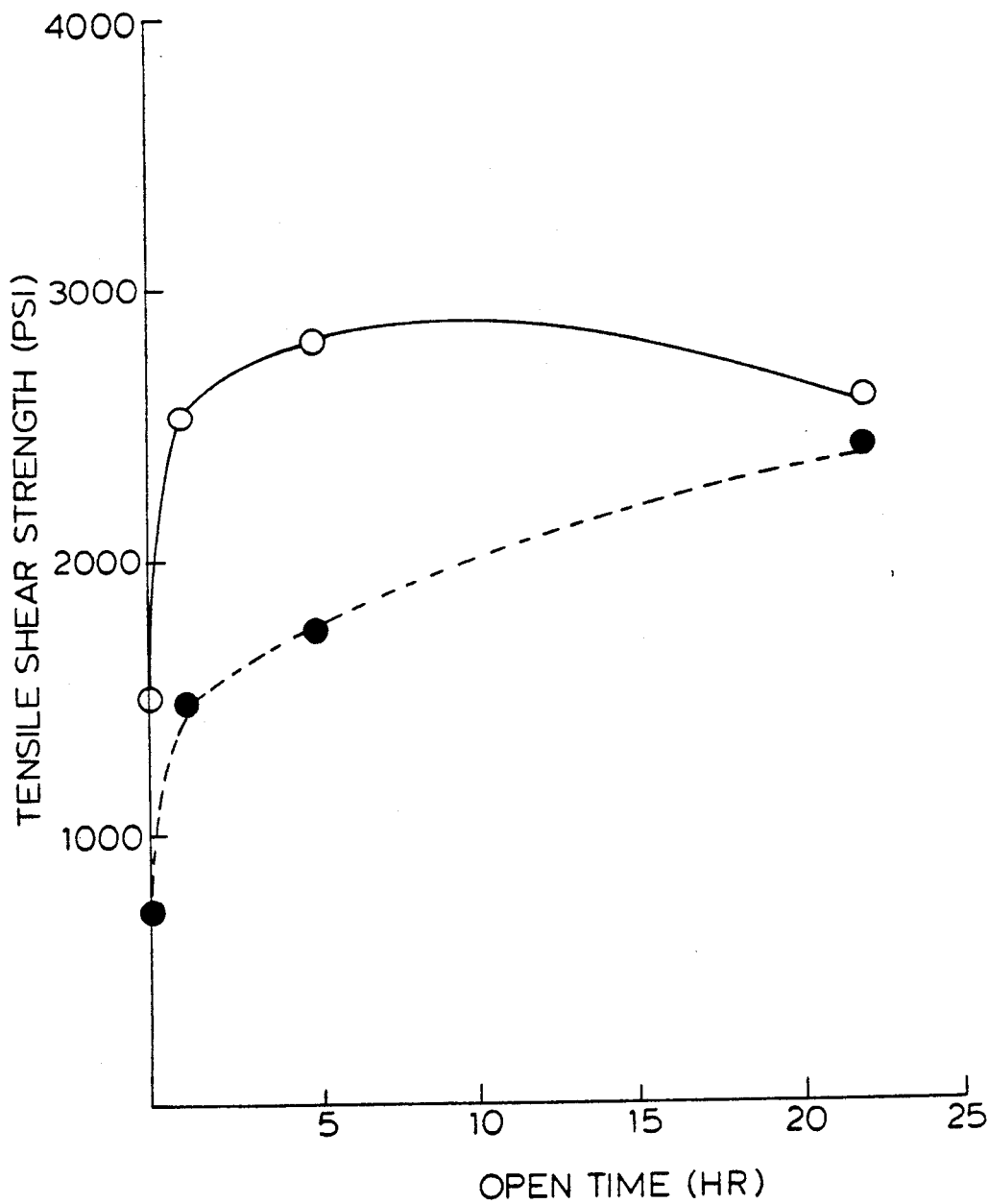
FIG. 13 is a graph of the results of an open time test on a distearylmethylammonium stearate primer at varying concentrations in a Freon® solvent, in which —○— indicates 0.05% primer and —●— indicates 0.1% primer.
Figure 14:
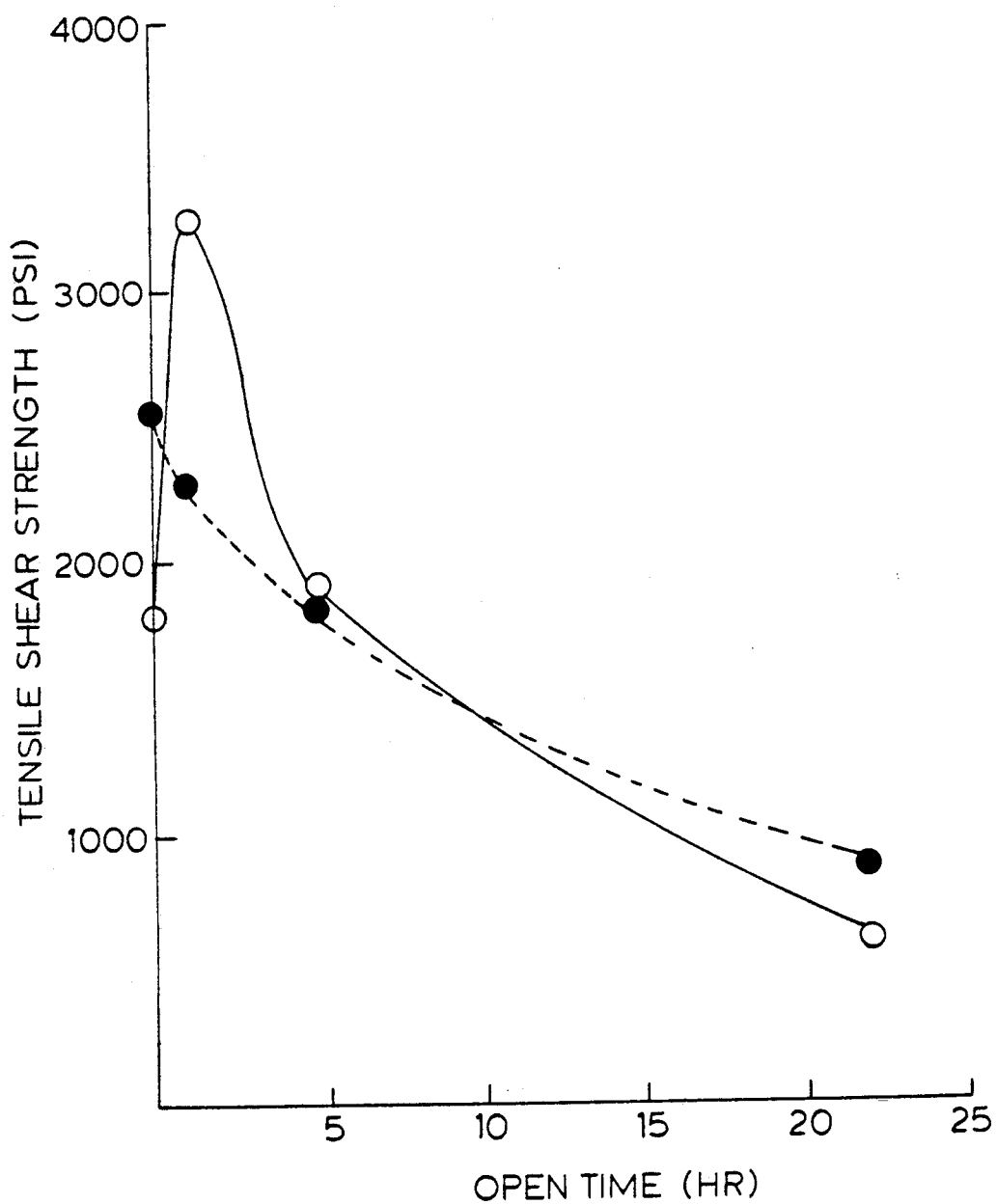
FIG. 14 is a graph of the results of an open time test on a distearylmethylammonium stearate primer at varying concentrations in a toluene solvent, in which —○— indicates 0.05% primer, and —●— indicates 0.1% primer.

The effect of varying the solvent from IPA to toluene and FREON ® TMS was tested with distearylmethylammonium stearate as a primer. As shown for IPA, FREON ® TMS and toluene, respectively, in FIGS. 1, 13, and 14, IPA generally appears to be the best solvent, with FREON ® TMS being comparable to IPA at certain primer concentrations.

EXAMPLE XV

Two selected primer compositions, distearylmethylamine and distearylmethylammonium octanoate, were evaluated for their performance in a heat and humidity test, with exposure to a water-saturated moist atmosphere at 90° C. for 2 hours. As shown in Table I, no adhesion deterioration of the tested primers was observed in a hot and humid environment.

TABLE I

| Primer | Gap (mil) | Adhesion (psi) |
|---|---|---|
| Distearylmethylamine | 0 | 3145 |
| Distearylmethylamine | 10 | 3272 |
| Distearylmethylammonium octanoate | 0 | 3232 |
| Distearylmethylammonium octanoate | 10 | 3165 |

The results of the experiments with primers exemplified by the above examples indicate that the trialkylammonium alkyl carboxylate primers perform significantly better with long exposure to air over a wide range of concentrations than the other primers tested, including the trialkylamines, the tetraalkylammonium halides and alkyl carboxylates and TPP.

Although the present invention has been described with reference to the above examples, and various preferred aspects, features, and embodiments thereof, it will be apparent to those skilled in the art that changes may be made without departing from the spirit and scope of the invention.

What is claimed is:

1. A two-part composition for adhesively bonding surfaces, comprising:
   (a) a cyanoacrylate adhesive composition; and
   (b) a primer comprising at least one tertiary ammonium carboxylate compound of the formula:

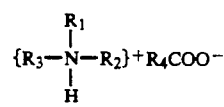

wherein:
   $R_1$, $R_2$, $R_3$, and $R_4$ may each vary independently of the others and are each selected from the group consisting of alkyl, alkenyl, alkynyl, alkylaryl, and aralkyl.

2. A two-part composition according to claim 1, wherein at least one of the $R_1$, $R_2$ and $R_3$ groups is a long chain alkyl moiety having 6–20 carbon atoms and $R_4$ is selected from the group consisting of alkyl and alkenyl.

3. A two-part composition according to claim 2, wherein each of the long chain alkyl moieties has at least 16 carbon atoms and each of the other $R_1$, $R_2$, and $R_3$ groups is a short chain alkyl group having less than five carbon atoms.

4. A two-part composition according to claim 2, wherein the $R_1$, $R_2$ and $R_3$ groups are each $C_{12}H_{25}$ and $R_4$ is selected from the group consisting of alkyl groups having 6 to 20 carbon atoms.

5. A two-part composition according to claim 4, wherein $R_4COO^\ominus$ is selected from the group consisting of oleate and stearate.

6. A two-part composition according to claim 1, wherein said tertiary ammonium carboxylate compound is dissolved in a low surface tension organic solvent.

7. A two-part composition according to claim 6, wherein the tertiary ammonium carboxylate compound has a concentration of from about 0.05% to about 1.0% by weight, based on the volume of the solvent.

8. A two-part composition according to claim 7, wherein the solvent comprises isopropanol.

9. A two-part composition according to claim 7, wherein the solvent comprises trichlorofluoroethane.

10. A two-part composition according to claim 1, wherein the at least one tertiary ammonium carboxylate compound comprises a compound selected from the group consisting of distearylmethylammonium stearate, tridodecylammonium oleate, tridodecylammonium palmitate, distearylmethylammonium acetate, tristearylammonium stearate, distearylmethylammonium oleate, tridodecylammonium stearate, and mixtures thereof.

11. A two-part composition according to claim 1, wherein $R_4$ is a long chain moiety having 6–20 carbon atoms in the chain and at least one of the $R_1$, $R_2$ and $R_3$ groups is a long chain moiety having 6–20 carbon atoms in the chain.

12. A two-part composition according to claim 11, wherein $R_4$ is selected from the group consisting of alkyl and alkenyl.

13. A two-part composition according to claim 11, wherein each of the $R_1$, $R_2$, and $R_3$ groups comprising long chain moieties has at least 16 carbon atoms in the chain and each of the other $R_1$, $R_2$ and $R_3$ groups is a short chain alkyl group having less than 5 carbon atoms.

14. A two-part composition according to claim 11, wherein each of $R_1$, $R_2$, $R_3$ and $R_4$ groups is independently selected from the group consisting of alkyl groups having 6 to 20 carbon atoms.

15. A two-part composition according to claim 11, wherein $R_4COO^-$ is selected from the group consisting of oleate and stearate.

16. A two-part composition according to claim 11, wherein $R_4$ is a long chain moiety having 10 to 15 carbon atoms in the chain.

17. A two-part composition according to claim 11, wherein the tertiary ammonium carboxylate compound comprises distearylmethylammonium stearate.

18. A two-part composition according to claim 11, wherein the tertiary ammonium carboxylate compound comprises distearylmethylammonium oleate.

19. A two-part composition according to claim 11, wherein the tertiary ammonium carboxylate compound comprises tridodecylammonium stearate.

20. A two-part composition according to claim 11, further comprising a low surface tension organic solvent for the tertiary ammonium carboxylate compound, wherein the tertiary ammonium carboxylate compound has a concentration of from about 0.05% to about 1.0% by weight, based on the volume of the solvent.

21. A two-part composition according to claim 11, wherein the primer comprises isopropanol as a solvent for the tertiary ammonium carboxylate compound.

22. A two-part composition according to claim 11, wherein the primer comprises trichlorofluoroethane as a solvent for the tertiary ammonium carboxylate compound.

23. A two-part composition for adhesively bonding surfaces, comprising:
(a) a cyanoacrylate adhesive composition, and
(b) a non-aqueous primer composition consisting essentially of:
  (i) at least one tertiary ammonium carboxylate compound selected from the group consisting of: distearylmethylammonium stearate, tridodecylammonium stearate, distearylmethylammonium oleate, tridodecylammonium oleate, tridodecylammonium palmitate, and tristearylammonium stearate; and
  (ii) a non-aqueous, low surface tension organic solvent for the tertiary ammonium carboxylate compound.

24. A two-part composition according to claim 23, wherein the tertiary ammonium carboxylate compound is selected from the group consisting of distearylmethylammonium stearate, distearylammonium oleate, tridodecylammonium stearate, and tridodecylammonium oleate.

25. A two-part composition according to claim 23, wherein the solvent is selected from the group consisting of alcohols, halogenated hydrocarbon solvents, and mixtures thereof.

* * * * *

UNITED STATES PATENT AND TRADEMARK OFFICE
CERTIFICATE OF CORRECTION

PATENT NO. : 5,066,743

DATED : November 19, 1991

INVENTOR(S) : Y. Okamoto, et al

It is certified that error appears in the above-identified patent and that said Letters Patent is hereby corrected as shown below:

In the Abstract, line 2 of text, change "surface" to --surfaces--.
Column 1, line 41, after "enhanced" insert --.--.
Column 2, line 37, after "thereof" insert --.--.
Column 2, line 47, change "here" to --there--.
Column 4, line 28, change "$R_4COO^{\oplus}$" to --$R_4COO^{\ominus}$--.
Column 4, lines 53-54, change "alphacyanoacrylate" to --alpha-cyanoacrylate--.
Column 4, line 66, change "$R_4COO^{\oplus}$" to --$R_4COO^{\ominus}$--.
Column 5, line 36, change "carboxyate" to --carboxylate--.
Column 5, line 37, change "$[(C_{12}H_{25})_3NH]^{\ominus}R_4COO^{\oplus}$" to --$[(C_{12}H_{25})_3NH]^{\oplus}R_4COO^{\ominus}$--.

Column 5, line 51, change "he" to --the--.

Column 8, line 68, change "SANTOPRENER" to --SANTOPRENE®--.
Column 10, line 29, change "EXAMPLE II" to --EXAMPLE III--.

Signed and Sealed this

Thirteenth Day of April, 1993

Attest:

STEPHEN G. KUNIN

Attesting Officer

Acting Commissioner of Patents and Trademarks